United States Patent

[11] 3,576,994

[72] Inventors Paul B. Parks
Aiken, S.C.;
Mark Brown, Augusta, Ga.
[21] Appl. No. 841,573
[22] Filed July 14, 1969
[45] Patented May 4, 1971
[73] Assignee The United States of America as represented by the United States Atomic Energy Comission

[54] NEUTRON RADIOGRAPHY OF DEUTERATED TISSUE
5 Claims, No Drawings
[52] U.S. Cl. .................................................. 250/83.1,
250/43.5, 128/2, 250/65, 250/106
[51] Int. Cl. ..................................................... G01t 3/00
[50] Field of Search ........................................... 250/83.1,
43.5 (D,R), 44, 106 (T), 65, 83.3; 128/2 (X)

[56] References Cited
OTHER REFERENCES

Breynat et al.; Materials Evaluation; " Utilization of Small Acceleration Neutron Generators for Neutron Radiography"; Oct. 1969; PP. 220— 224; 250/83.1

*Primary Examiner*—James W. Lawrence
*Assistant Examiner*—Morton J. Frome
*Attorney*—Roland A. Anderson ABSTRACT: An improved method of preparing a neutron radiograph of biological media by first contacting the media with a fluid containing deuterium such as deuterium oxide. The protium in the nonfatty tissue is replaced with deuterium to substantially reduce the neutron capture and scatter within the deuterated tissue. Consequently, the radiolucency of the nonfatty tissue is greatly increased. Deuterium does not significantly replace the protium in the fatty tissue which therefore remains radiopaque in contrast to the radiolucent nonfatty tissue.

3,576,994

NEUTRON RADIOGRAPHY OF DEUTERATED TISSUE

BACKGROUND OF THE INVENTION

The invention described herein was made in the course of or under a contract with the U.S. Atomic Energy Commission.

1. Field of Invention

The method of this invention can be used to prepare neutron radiographs for medical research of pathology. If the deleterious effects of deuterium oxide in high concentrations within the human body can be overcome, the method may also have clinical diagnostic value. It is particularly applicable in slow neutron radiography to increase penetration depth, reduce absorbed dose and to improve contrast of fatty to nonfatty tissue.

2. Description of Prior Art

The medical sciences have long employed radiography as a useful tool in research, pathology and diagnosis. Roentgenographs have been prepared for the examination of biological tissues by passing X-rays through a subject and receiving those X-rays which are not blocked or scattered on a radiographic film or plate. Bone cortex is radiopaque to X-rays and therefore projects a strong image onto the roentgenograph. Soft tissues such as muscle, body fluids, and fat are much more radiolucent to X-rays and are more difficult to examine in this manner.

Slow neutron (energy less than 100 ev.) radiographs have been prepared to reveal soft tissue. These tissues have a high hydrogen content with protium (hydrogen-1) as by far the most abundant hydrogen isotope.

The high neutron scatter cross section of protium in conjunction with its high density cause hydrogen to be principally responsible for the neutron attenuation in tissue. The attenuation is so severe that slow neutron radiography is generally limited to tissues no thicker than one inch. Bone cortex, which contains less hydrogen than soft tissue, is generally more radiolucent to neutron radiation of less than 1 Mev. energy.

Both scattered and absorbed neutrons contribute to the biological dose sustained by the tissue. Low energy neutrons are absorbed by protium to produce deuterium and 2.2 Mev. gamma radiation, i.e. the $^1H(n,\gamma)^2H$ reaction. The gamma photons produced may ionize surrounding molecules to damage the tissue or may escape from thin tissue without further interaction. Other neutrons are absorbed in the $^{14}N(n,p)_{14}$ reaction to give off protons. The energy of the protons is delivered into the tissue in a short distance such that this (n,p) reactions dominates the biological dose in thin tissue, but in thicker tissues the (n,$\gamma$) reaction prevails.

The ordinary neutron radiograph shows little or no contrast between different types of hydrogenous tissue. Fat cannot be distinguished from muscle tissue. Animal and human members often have an abundance of hydrogenous tissue, both fat and muscle at their surface portions. A thermal neutron radiograph may therefore only reveal an overall projection of the member.

SUMMARY OF THE INVENTION

It is therefore an object of the present invention to provide an improved method for preparing a neutron radiograph to distinguish fatty tissue from other biological media.

It is a further object to provide a method of slow neutron radiography which permits examinations of biological samples of increased thicknesses.

It is also an object to provide a method of neutron radiography which imparts reduced radiation dose to examined tissue.

In accordance with the present invention, biological media is treated with a fluid containing deuterium to selectively deuterate the nonfatty portion thereof and render that nonfatty portion neutron radiolucent. The biological media is then radiographed with neutron radiation.

DETAILED DESCRIPTION

Protium in certain biological media can be replaced with deuterium by treating the media with deuterium oxide. It has been found that a significant amount of either protium or ordinary water in muscle, body fluid and bone tissue will exchange for deuterium or deuterium oxide respectively while little or no corresponding exchange will occur in fatty tissue. This phenomena results in a selective substitution of deuterium for protium in nonfatty tissues only. In addition to deuterium oxide, other deuterium containing fluids which will selectively substitute deuterium for protium in nonfatty tissue may also be used in practicing this invention.

Deuterium has a much lower scattering and capture cross section for neutrons of energy below 1 Mev. than protium. Accordingly, deuterated tissue will attenuate neutron radiation to a much lesser extent than comparable nondeuterated tissue. For example, calculated linear attenuation coefficients of 0.025 ev. neutrons in muscle and bone cortex are reduced from about 3.43 cm.[11] and 2.33cm.[11] to about 0.49 cm.[11] and 0.48 cm.[11], respectively, after complete deuteration. Since fatty tissue does not deuterate significantly its linear attenuation coefficient is about 3.46 cm.[11] whether the media is in contact with ordinary water or deuterium oxide. Consequently, improved delineation of fatty tissue will become manifest in a neutron radiograph of dueterated material. Furthermore, the overall decrease in neutron attenuation allows biological media of increased thickness to be examined with neutrons, of less than 1 Mev. energy but most significantly at thermal energies (less than 0.5 ev.)

Another advantage resulting from deuteration of biological media prior to radiography with neutron beams is reduced radiation dose. Deuterium neither captures not scatters neutrons to the extent of protium. The $^1H(n,\gamma)^2H$ reaction is replaced by the less probable $^2H(n,\gamma)^3H$ reaction. The cross section of this latter event is about 1,500 times smaller for thermal neutrons than that of the former. Although radioactive tritium ($^3H$) is produced in the latter reaction, its half life is long, 12.3 years, and therefore the tritium residual contributes little to dose.

Various methods can be used to deuterate biological media prior to preparation of a neutron radiograph. An in vitro sample of tissue can be submerged and soaked in a fluid such as deuterium oxide for a suitable period of time. Preferably, 70percent to 100 percent by weight of the protium in the sample is replaced with deuterium to provide sufficient deuteration. A like amount of deuteration can be achieved by infusing deuterium oxide into catheterized arteries of an animal limb or member. The deuterium oxide will perfuse through the member and displace ordinary body fluids. The displaced fluids with protium must be removed from the member prior to making a radiograph as protium will attenuate neutron radiation notwithstanding the deuteration of tissue. Catheterized veins or an open end of the member can provide an outlet for protium removal.

Deuteration of in vivo subjects is made more difficult by the toxicity of deuterium oxide. Thus far only expandable laboratory animals have been treated with substantial amounts of deuterium while alive. Rats have died when 30 precent—35 percent by weight of body protium was replaced with deuterium. It may be possible to isolate limb members and subject them to temporary replacement of 70 —100 percent by weight of body protium with deuterium oxide as the agent. Also, arteries and veins might be catheterized and a deuterated saline, plasma, or similar blood substitute circulated through the limb to achieve sufficient deuteration.

Selectively deuterated tissue has been in most instances radiographed with termal neutron flux. This has been due to the availability of suitable thermal flux densities from nuclear reactors. However, deuteration may have applicability in neutron radiography with neutron energies up to 1 Mev. where the neutron scatter cross sections of deuterium and protium begin to converge.

A suitable neutron source of relatively high source strength must be provided. For thermal neutron radiography, a neutron source which will produce a well collimated beam with a flux density in excess of about $5\times10^5$ neutrons/ $(cm.^2)(sec)$ can be used. This minimum flux density required is established by a need to complete a radiograph of biological media in a reasonable time. Lower flux densities can be used by the subject will require longer exposure and will possibly deteriorate. Nuclear reactors supplying a collimated thermal neutron flux of $3-9\times10^6$ neutrons/$(cm.^2)(sec)$ have been found to produce a suitable radiograph.

When available in sufficient quantities, californium-252 may provide a suitable neutron source. The average energy of neutron radiation from californium-252 is 2.3 Mev. and therefore moderation will be required.

Another possible neutron source is antimony-124 and beryllium. A 200 milliliter volume of these elements in suitable proportion can produce $5 \times 10^{10}$ neutrons per second. Since the average neutron energy is only about 24 Kev., little or no moderation with less resulting flux loss is required. However, high gamma radiation from this source makes it difficult to handle and can damage the subject being radiographed.

EXAMPLE I

An amputated human finger was injected with paraffin wax under the distal phalanx to provide known nondeuterating material within a biological medium. Multiple longitudinal slits were made in the skin to allow penetration of the deuterium oxide. The finger was submerged and soaked in deuterium oxide for 48 hours prior to making the radiograph. The radiograph was made with the Savannah River Laboratory Standard Pile Reactor at a neutron flux density of about $3\times10^6$ neutrons/$(cm.^2 ,sec.)$. An integrated incident flux of about $4\times10$neutrons/cm.$^2$ was used. The specimen was placed on an aluminum planchet and exposed to the neutron beam from the reactor. The image was formed on a 0.010 inch thick sheet of pure dysprosium by neutron activation to produce dysprosium-165 having a half life of 2.3 hours. The image was subsequently recorded on double emulsion, high speed X-ray film (Kodak NS54-T available from the Eastman Kodak Co., Rochester, N.Y. 14650). An antiscatter grid, ("Antiscatter Grids for Low Energy Neutron Radiography, " RADIOLOGY, Vol. 92, 178, 1969) was disposed between the specimen and the dysprosium sheet to intercept scattered neutrons. The neutron radiograph clearly showed the injected paraffin wax, other normally occurring fatty tissue, and the bone marrow, none of which were readily apparent in a reontgenograph of the amputated digit.

EXAMPLE II

An arteriograph of a rat rear leg, paw and tail was prepared by injecting neutron opaque gadolinium oxide in oil into the aorta immediately after the animal was sacrificed. The rear portion was severed and soaked in deuterium oxide for 48 hours. A neutron radiograph was prepared in a similar manner to that employed in Example I. A neutron flux density of about $9 \times 10^6$neutrons/$(cm^2)(sec)$ from the Georgia Institute of Technology Research Reactor was used until an integrated incident neutron flux of about $1.7 \times 10^{10}$ neutron/cm.$^2$ had been achieved. A neutron radiograph recorded on suitable X-ray film showed arteries in the rat rear portion even where overlaid by bone.

EXAMPLE III

A severed canine paw was infused with a deuterium oxide saline solution through a catheterized artery. The solution was allowed to from the severed veins to remove protium from the member. Infusion was continuously performed at a rate of about 15 cc./minute for a total of about three hours. Neutron radiographs were prepared before infusion, after 23 minutes, after 60 minutes, after 99 minutes, and after 182 minutes of deuterium oxide infusion. Each radiograph was made with a total incident flux of about $2.7\times10^9$ neutrons/cm.$^2$ projected at a rate of about $3\times10^6$ neutrons/$(cm.^2)(sec)$. The thermal neutron radiation dose sustained by the canine paw was calculated to be 0.9 rad while preparing the radiograph of the nondeuterated paw and 0.2 rad while the radiograph following 182 minutes of deuteration was prepared. The three radiographs made after 60 minutes, 90 minutes and 182 minutes deuterium oxide infusion all clearly delineated fat pads and fatty bone marrow within the paw. The nondeuterated paw appeared to have a constant radiodensity throughout regardless of the different type tissue in different portions of the paw.

This invention provides an improved method of preparing a neutron radiograph. Deuteration improves contrast between fatty and nonfatty tissue. Deuterated bone cortex and muscle tissue are more radiolucent to a neutron beam than similar nondeuterated tissue to allow direct examination of fatty deposits within the bone marrow. Deuterated biological media incurs reduced capture and scattering of neutrons to decrease absorbed radiation dose and increase the media thickness which can be examined by neutron radiography, at energies below 1 Mev.

We claim:

1. In the neutron radiography of biological media, the improvement comprising:
    a. treating said biological media with a fluid containing deuterium to selectively substitute deuterium for a major proportion of the protium in the nonfatty portions of said media, and
    b. taking a neutron radiograph of said treated biological media.

2. The method according to claim 1 wherein said fluid includes deuterium oxide.

3. The method according to claim 1 wherein said fluid is introduced into catheterized arteries to perfuse throughout said biological media and a portion of said fluid is discharged from said media to remove displaced protium therefrom.

4. The method according to claim 1 wherein greater than 70 percent by weight of the protium in said biological media is replaced with deuterium.

5. The method of claim 1 wherein said neutron radiograph is taken with a thermal neutron flux density of more than $5\times10$

UNITED STATES PATENT OFFICE
CERTIFICATE OF CORRECTION

Patent No. 3,576,994    Dated May 4, 1971

Inventor(s) Paul B. Parks and Mark Brown

It is certified that error appears in the above-identified patent and that said Letters Patent are hereby corrected as shown below:

Column 1, line 9, change "of pathology" to --or pathology--;

line 47, change "$^{14}N(n,p)_{14}$" to --$^{14}N(n,p)^{14}C$--;

Column 2, lines 20, 21 and 23, change "$cm.^{11}$" in each occurrence to --$cm.^{-1}$--;

line 70, change "termal" to --thermal--.

Column 3, line 7, change "be used by" to --be used but--;

Column 4, line 10, after "allowed to" insert --drain--.

Claim 5, line 56, change "5x10" to --$5x10^5$-- and insert thereafter --neutrons /($cm^2$) (sec)--.

Signed and sealed this 4th day of January 1972.

(SEAL)
Attest:

EDWARD M. FLETCHER, JR.
Attesting Officer

ROBERT GOTTSCHALK
Acting Commissioner of Pa